United States Patent
Koyata et al.

(10) Patent No.: US 8,685,156 B2
(45) Date of Patent: Apr. 1, 2014

(54) MODIFYING CLAY ACTIVITY AND SLUMP RETENTION IN CEMENTITIOUS COMPOSITIONS

(75) Inventors: Hideo Koyata, Kanagawa (JP); Shuqiang Zhang, Singapore (SG); Byong-wa Chun, Rancho Palos Verdes, CA (US)

(73) Assignee: W. R. Grace & Co.-Conn., Columbia, MD (US)

( * ) Notice: Subject to any disclaimer, the term of this patent is extended or adjusted under 35 U.S.C. 154(b) by 212 days.

(21) Appl. No.: 12/997,723

(22) PCT Filed: Jul. 10, 2009

(86) PCT No.: PCT/JP2009/062931
§ 371 (c)(1),
(2), (4) Date: Dec. 13, 2010

(87) PCT Pub. No.: WO2010/005117
PCT Pub. Date: Jan. 14, 2010

(65) Prior Publication Data
US 2011/0088599 A1    Apr. 21, 2011

(30) Foreign Application Priority Data
Jul. 11, 2008  (JP) ................................. 2008-181296

(51) Int. Cl.
*C04B 24/04* (2006.01)
*C04B 24/12* (2006.01)

(52) U.S. Cl.
USPC ............ 106/718; 106/727; 106/728; 106/823

(58) Field of Classification Search
USPC .................................. 106/718, 727, 728, 823
See application file for complete search history.

(56) References Cited

U.S. PATENT DOCUMENTS

| | | | |
|---|---|---|---|
| 2,588,248 A | 3/1952 | Klein | |
| 4,366,071 A * | 12/1982 | McLaughlin et al. | 507/222 |
| 4,393,939 A * | 7/1983 | Smith et al. | 166/293 |
| 4,861,375 A * | 8/1989 | Nakano et al. | 524/8 |
| 5,024,768 A * | 6/1991 | Merrell | 210/712 |
| 5,232,497 A | 8/1993 | Dillenbeck et al. | |
| 5,668,219 A | 9/1997 | Polizzotti et al. | |
| 6,352,952 B1 * | 3/2002 | Jardine et al. | 501/141 |
| 6,441,054 B1 | 8/2002 | Ou et al. | |
| 6,670,415 B2 * | 12/2003 | Jardine et al. | 524/445 |
| 7,244,694 B2 | 7/2007 | Fu et al. | |
| 8,070,875 B2 * | 12/2011 | Jeknavorian et al. | 106/696 |
| 8,167,998 B2 * | 5/2012 | Ladely (Guevara) et al. | 106/724 |
| 8,257,490 B2 * | 9/2012 | Alain et al. | 106/802 |
| 2002/0121229 A1 * | 9/2002 | Jardine et al. | 106/681 |
| 2003/0172850 A1 | 9/2003 | Chun et al. | |
| 2004/0072715 A1 | 4/2004 | Griese et al. | |
| 2004/0198873 A1 | 10/2004 | Bury et al. | |
| 2006/0166837 A1 | 7/2006 | Lin et al. | |
| 2007/0287794 A1 | 12/2007 | Alain et al. | |
| 2008/0060556 A1 * | 3/2008 | Jacquet et al. | 106/802 |

FOREIGN PATENT DOCUMENTS

| | | |
|---|---|---|
| EP | 0256144 B1 | 6/1990 |
| EP | 1693352 A1 | 8/2006 |
| JP | 2092852 A | 4/1990 |
| JP | 2271953 A | 11/1990 |
| JP | 6128001 A | 5/1994 |
| JP | 2006045010 A | 2/2006 |
| WO | 9858887 A1 | 12/1998 |
| WO | 2006032785 A2 | 3/2006 |

OTHER PUBLICATIONS

Buscher, Form PCT/ISA/210, International Search Report, PCT/JP2009/062931, Nov. 30, 2009, 4 pp.
Buscher, Form PCT/ISA/237, Written Opinion of the International Searching Authority, PCT/JP2009/062931, Nov. 30, 2009, 8 pp.

* cited by examiner

*Primary Examiner* — Paul Marcantoni
(74) *Attorney, Agent, or Firm* — Craig K. Leon

(57) ABSTRACT

The present invention relates to the use of polycationic compound in combination with a hydroxycarboxylic acid or salt thereof to enhance slump retention in cements and concretes having clay-bearing aggregates, wherein the clay otherwise absorbs or diminishes the dosage efficiency of polycarboxylate superplasticizers.

7 Claims, No Drawings

US 8,685,156 B2

MODIFYING CLAY ACTIVITY AND SLUMP RETENTION IN CEMENTITIOUS COMPOSITIONS

TECHNICAL FIELD

The present invention relates to modification of properties in hydratable cementitious materials, and more particularly to an improved chemical admixture and method for modifying cement mortars and concretes using a polycationic compound, a hydroxycarboxylic acid or salt thereof, and a polycarboxylate superplasticizer.

BACKGROUND ART

It is known to use oxyalkylene-containing polymers as superplasticizers or water-reducers in concrete. For example, in U.S. Pat. No. 5,393,343, Darwin et al. disclosed "EO/PO" type comb polymers, containing ethylene oxide and/or propylene oxide groups, that were useful as superplasticizers for retaining "slump" (a property similar to the concept of flowability) in cement mortars and concretes over a sustained period of time.

Also known is the use of various agents for inhibiting the adverse effects of certain swellable clays, such as smectites and montmorrillonites, on the dosage-efficiency of such superplasticizers. These clays are sometimes contained in sand aggregates used for making mortar cement and concrete, and often cause poor workability in the fresh cement or concrete.

It was theorized that such clays expanded when initially wetted by the mix water, such that, in the expanded state, the clays absorbed or entrapped the superplasticizer. This in turn decreased the dosage efficiency because more superplasticizer would be needed to maintain the desired slump level in the hydrating cementitious composition, such as might be required for transporting the mix in a truck or pouring the mix at the construction site.

In U.S. Pat. Nos. 6,352,952 B1 and 6,670,415 B2, Jardine et al. (Grace Construction Products) first realized that this problem was caused by certain clays, and disclosed the use of various agents for preventing the clays from absorbing the superplasticizers, thus restoring dosage response. Such clay-activity-modifying agents included inorganic cations, organic cations, polar organic molecules capable of clay-absorption, clay dispersants such as polyphosphates, and mixtures thereof.

In the wake of Jardine et al., others in the industry began to focus on clay-inerting agents in cements. For example, in US 2007/0287794 A1, Alain et al. explained that cationic polymers, such as quaternary amines, were particularly appropriate for inerting clays. Along these lines, Japanese Patent application No. KOKAI 2006-45010 disclosed that a quaternary ammonium group, such as poly-diallyldimethylammonium chloride, could be used to increase effectiveness of the cement dispersant when in the presence of undesirable fine aggregates containing the problematic clay minerals.

The present inventors believe that the problems caused by clay-containing sands will increase in the cement and concrete industries due to a decline in the supply of high quality natural sand. Such sand aggregates will have a significant effect on the rheological and physical properties of mortars and concretes. The specific gravity, particle size distribution, shape and surface textures of the sand aggregate will influence the rheological properties of cement mortars and concretes in their plastic state; while the mineralogical composition, toughness, elastic modulus, and other properties of the aggregates will affect cement mortars and concretes in their hardened state.

SUMMARY OF THE INVENTION

The inventors have surprisingly found that when a poly-cationic compound is formulated in combination with a poly-hydroxy or hydroxyl carboxylic acid compound, the clay-inerting effectiveness of each component is dramatically improved with respect to maintaining dosage efficiency of polycarboxylate dispersants in cement mortar or concrete.

In addition, when such combination is employed, the clay-inerting effectiveness of the cationic polymers becomes significantly less sensitive to the types of cationic polymer used.

Furthermore, the present inventors believe that such a combination has synergistic effects. On occasions in which a poly-hydroxy or hydroxyl carboxylic acid compound is used alone with the polycarboxylate dispersant and clay-containing aggregate, the resultant cement mortar or concrete composition was not observed to have significant increase in slump retention. However, when the poly-cationic compound and poly-hydroxy or hydroxyl carboxylic acid compound were used together with a polycarboxylate dispersant, the slump retention was enhanced over time when compared to the control.

Thus, an exemplary method of the invention comprises: combining, with a clay-containing aggregate (such as sand) in which the clay is operative to absorb or otherwise decrease dosage efficiency of a polycarboxylate dispersant, at least one cationic compound (more preferably poly-cationic compound, such as a poly-quaternary ammonium acid or salt thereof) and at least one poly-hydroxyl or hydroxyl carboxylic acid or salt thereof.

In further exemplary methods, the one cationic and one poly-hydroxyl or hydroxyl carboxylic compounds can be combined with at least one polycarboxylate dispersant and cement to form a hydratable cementitious composition; and the components may be combined before, during, or after the cement and water are combined to form the fresh cement mortar or concrete.

The cationic compound, hydroxyl or hydroxyl carboxylic acid/salt compound, and polycarboxylate dispersant are preferably, although not necessarily, added together in the form of an admixture composition to the cement. An exemplary admixture composition of the invention thus comprises at least one cationic (and preferably poly-cationic) compound, at least one poly-hydroxyl or hydroxyl carboxylic acid or salt thereof, and at least one polycarboxylate dispersant.

In exemplary methods and admixture compositions, a preferred cationic compound is a quaternary ammonium salt (such as epihalohydrin alkylamines condensate or poly-diallyldimethylammonium chloride) and a preferred poly-hydroxyl or hydroxyl carboxylic acid or salt compound is a aldohexonic acid or salt thereof (such as sodium gluconate), an aldoheptonic acid or salt thereof, a aldopentonic acid or salt thereof, or mixtures thereof. A gluconate is preferred.

The present invention also pertains to cementitious compositions made by the afore-mentioned methods and containing the afore-mentioned components.

Although U.S. Pat. Nos. 6,352,952 and 6,670,415 disclosed that polar organic molecules could be combined with a gluconate, these patents did not teach or suggest that cationic compounds, such as poly-quaternary ammonium salts, could be combined a polyhydroxy or hydroxyl-carboxylate for purposes of enhancing slump retention in addition to mitigating clay effects.

DETAILED DESCRIPTION OF EXEMPLARY EMBODIMENTS

A particular description of a compound in its acid form (e.g., "polycarboxylic acid," "gluconic," etc.) shall be understood, where context permits, to include the salt form (e.g., "polycarboxylate," "gluconate"); and, conversely, a description of a compound in its salt form shall be understood to include its acid form, as may be permitted in the context in which such terms are employed.

The term "cements" and "cement composition" as used herein refer to pastes, mortars, grouts such as oil well cementing grouts, and concrete compositions, all of which comprise a hydraulic cement binder. The terms "paste", "mortar" and "concrete" are terms of art: pastes are mixtures composed of a hydraulic cement binder (usually, but not exclusively, Portland cement, masonry cement, or mortar cement and may also include limestone powder, hydrated lime, fly ash, blast furnace slag, and silica fume or other materials commonly included in such cements) and water; "mortars" are pastes additionally including a fine aggregate such as sand; and "concretes" are mortars additionally including coarse aggregate, such as crushed stone or gravel.

Cement compositions are formed by mixing required amounts of certain materials, e.g., a hydratable cement, water, and fine and/or coarse aggregates, as appropriate for making the cementitious composition desired.

The term "clay" as used in the present invention includes inorganic materials, as may be contained in sand aggregates, which absorb polycarboxylate dispersants or otherwise decrease their dosage efficiency when present in masonry cements or concrete containing such clay-containing aggregates. Such clays may include specifically 2:1 clays, which are typically considered to be swelling, absorbing clays often identified as smectite, montmorillonite, illite, hectorite, or bentonite clays. It is also contemplated that volcanic ash and amorphous clays are also included in the absorbtive type materials to be considered within the definition of "clay" as this term is used herein.

The terms "polycarboxylate cement dispersant," polycarboxylate dispersant," and the like as may be used herein refer to carboxylic acid/salt type dispersants as known in the art. These may also be referred to as oxyalkylene-containing water-reducers or EO/PO polymer superplasticizers, as explained in the background section above. Polycarboxylate polymers have oxyalkylene or "EO/PO" constituents, and include "comb" polymers having EO/PO constituents located in the backbones and/or in pendant groups. EO/PO polymers are most often acrylic polymers or copolymers thereof, which are imidized, as taught in U.S. Pat. No. 5,393,343. The use of polycarboxylate dispersants with clay-bearing aggregates was previously discussed in U.S. Pat. Nos. 6,352,952 B1 and 6,670,415 B2.

Accordingly, an exemplary method of the invention comprises:

combining, with a clay-containing aggregate (e.g., sand) in which the clay is operative to absorb or otherwise decrease dosage efficiency and/or dispersion retention ability of a polycarboxylate dispersant, at least one poly-cationic compound (such as a poly-quaternary ammonium acid or salt thereof), preferably in the amount of 0.1 ppm to 1000 ppm based on total weight of fine aggregate (sand) used in the cementitious composition, and more preferably in the amount of 1 ppm to 200 ppm; and at least one poly-hydroxy or hydroxyl carboxylic acid or salt thereof, preferably in the amount of 0.1 ppm to 1000 ppm based on total weight of fine aggregate (sand) used in the cementitious composition, and more preferably in the amount of 1 ppm to 500 ppm. The amounts of these components can be adjusted depending on the amount of detrimental clay levels present in the fine aggregate being used.

In further exemplary embodiments, at least one polycarboxylate dispersant, preferably in the amount of 0.001%-2.5%, and more preferably in the amount of 0.01-0.5%, this amount expressed in terms of percentage based on total weight of cement (which in this case will include cement, pozzolans, limestone and other silicate powders). The polycarboxylate dispersant can combined with the components before, during, or after cement is added to form a hydratable cementitious composition.

The components may be separately combined with the clay-containing aggregate, such as at a quarry or aggregate-producing plant, or may be combined before, during, or after the aggregates, cement, and water are mixed together to form the cement or concrete composition.

In one exemplary embodiment, the poly-cationic compound and poly-hydroxy or hydroxyl carboxylate compound can be added into a mixing drum containing ingredients for making the fresh masonry cement or concrete, before the polycarboxylate dispersant is added.

In another exemplary embodiment, the poly-cationic compound, poly-hydroxy or hydroxyl carboxylate compound, and the polycarboxylate dispersant are added as a pre-mixed admixture composition, preferably at the ready-mix plant where the concrete is batched into a truck mixing drum. Hence, the present invention also provides the aforementioned admixture composition that comprises the three components together in pre-measured amounts. This admixture composition may optionally comprise other admixtures that are conventionally employed in the cement and concrete industries.

Other variations wherein the components are added separately, in different sequences, or at different times or locations, are also permissible.

An exemplary poly-cationic compound is poly-quaternary ammonium. Preferred among these are epichlorohydrin-mimethylamine condenstate polymer and polydiallyldimethylammonium chloride.

It is believed that the present invention allows a wide range of cationic compounds, even the ones that have a relatively less effective clay-inerting property, to be used effectively in the present invention. Low molecular weight cationic polymers (e.g, <10,000 mw) can be used to obtain better initial slump, while higher molecular weight cationic polymers (e.g., >10,000 mw) may used to retain slump over a period of time.

An exemplary poly-hydroxyl or hydroxyl carboxylate component can be selected from the group consisting of aldonic acids and salts thereof, such as gluconate, other sugar acids and salts thereof, such as aldaric acids and uronic acids, other organic acids and salts thereof, such as citric acid, lactic acid, tartaric acid, and polyols, such as sorbitol, xylitol, lactitol, maltitol and glycerol, or mixtures thereof. Gluconates are preferred, and this includes sodium gluconate in particular.

While the invention is described herein using a limited number of embodiments, these specific embodiments are not intended to limit the scope of the invention as otherwise described and claimed herein. Modification and variations from the described embodiments exist. More specifically, the following examples are given as a specific illustration of embodiments of the claimed invention. It should be understood that the invention is not limited to the specific details set forth in the examples. All parts and percentages in the examples, as well as in the remainder of the specification, are by percentage weight unless otherwise specified.

Further, any range of numbers recited in the specification or claims, such as that representing a particular set of properties, units of measure, conditions, physical states or percentages, is intended to literally incorporate expressly herein by reference or otherwise, any number falling within such range, including any subset of numbers within any range so recited. For example, whenever a numerical range with a lower limit, RL, and an upper limit RU, is disclosed, any number R falling within the range is specifically disclosed. In particular, the following numbers R within the range are specifically disclosed: R=RL+k*(RU−RL), where k is a variable ranging from 1% to 100% with a 1% increment, e.g., k is 1%, 2%, 3%, 4%, 5% . . . 50%, 51%, 52%, . . . 95%, 96%, 97%, 98%, 99%, or 100%. Moreover, any numerical range represented by any two values of R, as calculated above, is also specifically disclosed.

EXAMPLES

A. Test Examples 1-3
(Cationic+Gluconate+Polycarboxylate)

A mortar flow test was performed in accordance with JIS A 5201. Ordinary Portland cement (a blend of three Japanese cements) was used. Ooi river sand was doped with 0.20 weight percent of sodium montmorillonite clay to simulate a problematic sand aggregate. The mix design comprised cement/sand/water/clay in a ratio of 700/1750/287/3.5 measured in grams weight. Both mortar slump and flow were measured, and workability was calculated using the formula: [workability]=[slump]+[flow]−100.

The testing involved making three control references ("REF") each containing a commercially available polycarboxylate ("PC") cement dispersant (AQUALOC® polymers available from Nippon Shokubai Co. Ltd., Japan), sodium gluconate ("GLU"), and/or a commercially available cationic polymer ("CAT"). The cationic polymer in this case was a product available as CatioMaster™ PD-7 from Yokkaichi Gosei, Japan, and is believed to be a polycondensation product of dimethylamine and epichlorohydrin (EPI-DMA).

In the three reference controls (REF), the polycarboxylate dispersant was either used alone (REF 1), with the gluconate (REF 2), or with the cationic polymer (REF 3); but in none of these reference controls was the gluconate combined with the cationic polymer.

However, in the three test examples (EX), the polycarboxylate dispersant was combined with both the gluconate and cationic polymer, in varying weight percentage amounts (as indicated below for EX 1, EX 2, and EX 3).

Component amounts in Table 1 are expressed in weight percentage.

TABLE 1

| | PC % | GLU % | CAT (%) | Workability (mm) | | |
| --- | --- | --- | --- | --- | --- | --- |
| | | | | 4 min | 30 min | 60 min |
| REF 1 | 0.16 | — | — | 56 | 26 | 10 |
| REF 2 | 0.16 | 0.04 | — | 161 | 123 | 38 |
| REF 3 | 0.16 | — | 0.02 | 171 | 151 | 40 |
| EX 1 | 0.16 | 0.02 | 0.02 | 170 | 226 | 161 |
| EX 2 | 0.16 | 0.04 | 0.01 | 185 | 210 | 130 |
| EX 3 | 0.16 | 0.04 | 0.02 | 163 | 220 | 166 |

"PC" = polycarboxylate dispersant;
"GLU" = sodium gluconate;
"CAT" = cationic compound;
"REF" = reference control sample;
"EX" = test example Table 1 indicates that combining gluconate with cationic polymer obtained unexpected, synergistic results in enhancing workability of the cement composition over time.

B. Test Examples 4-10 (Various Cationic Polmers with Gluconate)

A variety of cationic polymers was employed to demonstrate surprising flexibility of the formulation in terms of the choice of the cationic polymers. The following cationic polymers were employed in the formulations: a condensation polymer of epichlorohydrine and dimethylamine ("EPI-DMA"); poly-diallyldimethylammonium chloride ("DAD-MAC"), and condensation product of guanidine, cyano ammonium chloride, formaldehyde ("DICY"). The formulation components and weight percentages on the cement weight are summarized in Table 2.

TABLE 2

| | PC % | GLU % | CAT | CAT % |
| --- | --- | --- | --- | --- |
| REF 4 | 0.16 | 0.04 | — | — |
| EX 4 | 0.16 | 0.04 | EPI-DMA (1) | 0.02 |
| EX 5 | 0.16 | 0.04 | EPI-DMA (2) | 0.02 |
| EX 6 | 0.16 | 0.04 | EPI-DMA (3) | 0.02 |
| EX 7 | 0.16 | 0.04 | EPI-DMA (4) | 0.02 |
| EX 8 | 0.16 | 0.04 | DADMAC (5) | 0.02 |
| EX 9 | 0.16 | 0.04 | DADMAC-SO2 (6) | 0.02 |
| EX 10 | 0.16 | 0.04 | DICY(7) | 0.02 |

"PC" = polycarboxylate dispersant;
"GLU" = sodium gluconate;
"CAT" = cationic compound;
"REF" = reference control sample;
"EX" = test example
1. CAT = EPI-DMA: FL-2250 (SNF USA, USA)
2. CAT = EPI-DMA: FL-2350 (SNF Japan, Japan) Mw = 10,000
3. CAT = EPI-DMA: CatioMaster PD-7 (Yokkaichi Gosei) Mw = 5,000
4. CAT = EPI-DMA: CatioMaster PD-30 (Yokkaichi Gosei) Mw = 9,000
5. CAT = DADMAC: PAS H5-L (Nittobo, Japan) Mw = 40,000
6. CAT = DADMAC-SO2: PAS A1 (Nittobo, Japan) Mw = 5,000
7. CAT = DICY: DEC 56 (SNF Japan, Japan)

The mortar workability results of the example formulations are summarized in Table 3.

TABLE 3

| | Workability (mm) | | |
| --- | --- | --- | --- |
| | 4 minutes | 30 minutes | 60 minutes |
| REF 4 | 189 | 149 | 52 |
| EX 4 | 193 | 237 | 207 |
| EX 5 | 195 | 238 | 198 |
| EX 6 | 198 | 251 | 231 |
| EX 7 | 141 | 220 | 182 |
| EX 8 | 100 | 210 | 193 |

TABLE 3-continued

| | Workability (mm) | | |
|---|---|---|---|
| | 4 minutes | 30 minutes | 60 minutes |
| EX 9 | 186 | 242 | 213 |
| EX 10 | 212 | 228 | 194 |

"PC" = polycarboxylate dispersant;
"GLU" = sodium gluconate;
"CAT" = cationic compound;
"REF" = reference control sample;
"EX" = test example As seen in Table 3, the low molecular weight cationic polymers in combination with gluconate can restore the mortar workability effectively at dosages as low as 0.02% on the weight of cement. The higher molecular weight cationic polymer does not improve the initial workability, but were seen to improve workability substantially at low dosage rates.

C. Comparative Test Examples 1-3

For comparative purposes, testing of mortar containing quaternary ammonium polymer (EPI-DMA, FL2250) but without gluconate were performed. Amount of components, expressed in terms of weight percentage, are shown in Table 4.

TABLE 4

| | Sodium | | | Workability (mm) | | |
|---|---|---|---|---|---|---|
| | Montmorillonite | PC % | CAT % | 4 min | 30 min | 60 min |
| REF 5 | 0.00 | 0.16 | 0.00 | 237 | 256 | 221 |
| REF 6 | 0.20 | 0.16 | 0.00 | 47 | 21 | — |
| COMP 1 | 0.20 | 0.16 | 0.06 | 193 | 239 | 177 |
| COMP 2 | 0.20 | 0.16 | 0.08 | 197 | 265 | 235 |
| COMP 3 | 0.20 | 0.16 | 0.10 | 203 | 278 | 258 |

"PC" = polycarboxylate dispersant;
"GLU" = sodium gluconate;
"CAT" = cationic compound;
"REF" = reference control sample;
"COMP" = comparative test example As seen in Table 4, the quaternary ammonium polymer alone would require more than 0.06% dosage to restore the workability of polycarboxylate dispersant; whereas the present invention formulation is able to restore the workability with only 0.02%, as shown in test examples 1 through 7 (EX1-EX7).

D. Test Examples 11-12

Further mortar flow tests were performed based on the JIS A 5201 standard. Ordinary Portland cement (locally available in Singapore) was used. Singapore manufactured sand 2500 grams was added 5 grams of sodium montmorillonite clay. The mix design was Cement/Sand/Water/Clay=1000/2500/410/5 ratio in terms of grams weight. The flow value of the mortar was measured over a two-hour period. A small amount of defoamer was added to all the mixes to control air content in the mix. The formulation components and their respective amounts, expressed in grams weight, are summarized in Table 5.

TABLE 5

| | HRWR | HRWR dose [gram] | GLU [gram] | CAT (1) [gram] | Initial flow [mm] | 60-min flow [mm] | 120-min flow [mm] |
|---|---|---|---|---|---|---|---|
| REF 7 | NSFC (2) | 27.6 | | | 185 | 121 | 131 |
| REF 8 | PC (3) | 13.0 | | | 165 | 153 | 138 |
| REF 9 | PC (3) | 14.2 | 0.4 | | 146 | 155 | 149 |
| EX 11 | PC (3) | 15.3 | 0.4 | 0.39 | 130 | 238 | 216 |
| EX 12 | PC (3) | 15.8 | 0.4 | 0.65 | 220 | 250 | 227 |
| REF 10 | PC (3) | 15.3 | 0.4 | 0.91 | 122 | 209 | 207 |

"HRWR" = High Range Water Reducer;
"PC" = polycarboxylate dispersant;
"GLU" = sodium gluconate;
"CAT" = cationic compound;
"REF" = reference control sample;
"EX" = test example
(1) CAT = EPI-DMA: FL2250 (SNF USA, USA) 50% solution
(2) NSFC = Naphthalene sulfonate formaldehyde condensate 40% solution
(3) PC = Nippon Shokubai AQUALOC ™ slump retention polymer blend 45% solution As shown in the test examples above, the slump life of the mortar was dramatically improved by the combination of gluconate (GLU) and cationic polymer (CAT). The results for REF 10 suggest that excessive dosage of cationic polymer may not be necessarily favorable for improving initial workability.

E. Test Examples 13-14

Mortar flow test was performed based on JIS A 5201 standard. Ordinary Portland Cement (locally available in Singapore) was used. Singapore manufactured sand 2500 grams was added 5 grams of sodium montmorillonite clay. The mix design is [Cement/Sand/Water/Clay]=[1000/2500/410/5 (grams)]. The flow value of the mortar was measured over 30 minute periods. A small amount of defoamer was added to all the mix to control the air. The formulation components and their respective amounts expressed in grams weight are summarized in Table 6.

TABLE 6

| | HRWR | HRWR dose [gram] | GLU [gram] | CAT (1) [gram] | Initial flow [mm] | 30-min flow [mm] |
|---|---|---|---|---|---|---|
| REF 11 | NSFC (2) | 28 | — | — | 220 | 174 |
| REF 12 | PC (3) | 10.0 | 0.4 | — | 237 | 105 |
| EX 13 | PC (3) | 10.0 | 0.4 | 0.6 | 250 | 130 |
| EX 14 | PC (3) | 10.0 | 0.4 | 0.8 | 255 | 137 |
| REF 13 | PC (3) | 10.0 | 0.4 | 1.2 | 255 | 135 |

"HRWR" = High Range Water Reducer;
"PC" = polycarboxylate dispersant;
"GLU" = sodium gluconate;
"CAT" = cationic compound;
"REF" = reference control sample;
"EX" = test example
(1) CAT: EPI-DMA: FL2250 (SNF USA, USA) 50% solution
(2) NSFC: Naphthalene sulfonate formaldehyde condensate 40% solution
(3) PC: Nippon Shokubai Aqualoc polymer blend 45% solution As shown in the examples, the slump life of the mortar was significantly improved by the combination of gluconate and cationic polymer.

F. Test Examples 15-16

A concrete flow test was performed based on SS 320 standard. The concrete comprised a 50% slag and 50% ordinary Portland cement blend (locally available in Singapore). Singapore manufactured sand and 5 ~25 mm granite were used.

The mix design was [Cement/Sand/Stone/Water]=[360/869/941/195 (kg)]. The flow value of the mortar was measured over 2 hour period.

TABLE 7

| | GLU (1) ml/100 kg cement | CAT (2) wt. % on cement | Initial Slump [mm] | 60-min Slump [mm] | 120-min Slump [mm] |
|---|---|---|---|---|---|
| REF 14 | 400 | | 160 | 110 | 70 |
| EX 15 | 400 | 0.023% | 150 | 115 | 95 |
| EX 16 | 400 | 0.046% | 155 | 130 | 110 |

"GLU" = sodium gluconate;

"CAT" = cationic compound;

"REF" = reference control sample;

"EX" = test example (1) GLU = Sodium Gluconate 26% solution (2) CAT = EPI-DMA: FL2250 (SNF USA, USA) 50% solution As shown in the examples, the slump life of the concrete was significantly improved by the combination of gluconate and cationic polymer even without the presence of a polycarboxylate dispersant.

G. Test Examples 17-19

A mortar flow test was performed based on a modified JIS A 5201 standard. Ordinary Portland cement (locally available in Singapore) was used. To this Singapore-manufactured sand (2500 grams), 18 grams of montmorillonite clay was added to constitute 0.72% by weight of sand. The mix design is [Cement/Sand/Water/Clay]=[1000/2500/650/18 (grams)]. The flow value of the mortar was measured over a two hour period.

TABLE 8

| HRWR formulation [% in solution] | HRWR dose [grams] | Initial flow [mm] | 60-min flow [mm] | 120-min flow [mm] |
|---|---|---|---|---|
| REF 15 PC (15.5%) GLU (4%) | 30.0 | 154 | 131 | 126 |
| EX 17 PC (15.5%) GLU (4%) CAT (1.3%) | 30.0 | 255 | 255 | 187 |
| EX 18 PC (15.5%) GLU (4%) CAT (2.0%) | 30.0 | 255 | 255 | 255 |

TABLE 8-continued

| HRWR formulation [% in solution] | HRWR dose [grams] | Initial flow [mm] | 60-min flow [mm] | 120-min flow [mm] |
|---|---|---|---|---|
| EX 19 PC (15.5%) GLU (4%) CAT (2.6%) | 30.0 | 246 | 225 | 207 |

"HRWR" = High Range Water Reducer;

"PC" = polycarboxylate dispersant;

"GLU" = sodium gluconate;

"CAT" = cationic compound;

"REF" = reference control sample;

"EX" = test example

In summary, the slump life of the mortar was significantly improved by the combination of gluconate and cationic polymer as shown in the examples.

The foregoing embodiments and examples are provided for illustrative purposes only, and are not intended to limit the scope of the invention.

The invention claimed is:

1. A method for enhancing slump retention of a hydratable cementitious composition containing a clay-containing aggregate, comprising:
    combining with a clay-containing aggregate, in which the clay decreases dosage efficiency of a polycarboxylate cement dispersant in hydratable cementitious compositions, a polycarboxylate cement dispersant, a quaternary or poly-quaternary ammonium compound or the salt thereof which mitigates the effect of the clay on the polycarboxylate cement dispersant dosage efficiency when combined into a hydratable cementitious composition, and at least one poly-hydroxyl or hydroxyl carboxylic acid or salt thereof selected from the group consisting of gluconic acid or salt thereof, citric acid or salt thereof, sorbitol, and glycerol.

2. The method of claim 1 wherein the polycarboxylate dispersant is introduced to the clay-containing aggregate before, during, or after it is combined with cement into a hydratable cementitious composition.

3. The method of claim 1 wherein the poly-quaternary ammonium compound or salt thereof, and the at least one poly-hydroxyl or hydroxyl carboxylic acid or salt thereof is an aldonic acid or salt thereof, an organic acid or salt thereof, polyol, or mixtures thereof.

4. The method of claim 1 wherein the poly-quaternary ammonium compound or salt thereof is epihalohydrin alkylamine condensate.

5. The method of claim 1 wherein the quarternary or polyquaternary ammonium compound or salt thereof, the at least one poly-hydroxyl or hydroxyl carboxylic acid or salt thereof, and the at least one polycarboxylate dispersant are uniformly mixed before addition into concrete.

6. The method of claim 1 wherein the at least one poly-hydroxyl or hydroxyl carboxylic acid or salt thereof is sodium gluconate.

7. The method of claim 4 wherein the epihalohydrin alkylamine condensate is selected from the group consisting of epichlorohydrin dimethylamine condensate and polydiallyldimethylammonium chloride.

\* \* \* \* \*